US011798583B1

(12) United States Patent
Gong et al.

(10) Patent No.: US 11,798,583 B1
(45) Date of Patent: Oct. 24, 2023

(54) ELECTRODEPOSITION OF THERMALLY STABLE ALLOYS

(71) Applicant: Seagate Technology LLC, Fremont, CA (US)

(72) Inventors: Jie Gong, Eden Prairie, MN (US); Steven C. Riemer, Minneapolis, MN (US); John A. Rice, Long Lake, MN (US); Michael C. Kautzky, Eagen, MN (US)

(73) Assignee: Seagate Technology LLC, Fremont, CA (US)

(*) Notice: Subject to any disclaimer, the term of this patent is extended or adjusted under 35 U.S.C. 154(b) by 82 days.

(21) Appl. No.: 17/478,461

(22) Filed: Sep. 17, 2021

Related U.S. Application Data

(62) Division of application No. 16/411,629, filed on May 14, 2019, now Pat. No. 11,152,020.

(60) Provisional application No. 62/671,125, filed on May 14, 2018.

(51) Int. Cl.
| | |
|---|---|
| *G11B 5/31* | (2006.01) |
| *C25D 3/56* | (2006.01) |
| *C25D 5/18* | (2006.01) |
| *G11B 5/39* | (2006.01) |

(52) U.S. Cl.
CPC ............ *G11B 5/3163* (2013.01); *C25D 3/562* (2013.01); *C25D 5/18* (2013.01); *G11B 5/3909* (2013.01)

(58) Field of Classification Search
None
See application file for complete search history.

(56) References Cited

U.S. PATENT DOCUMENTS

| | | | |
|---|---|---|---|
| 6,132,892 A | 10/2000 | Yoshikawa et al. | |
| 6,778,357 B2 | 8/2004 | Tabakovic et al. | |
| 6,837,979 B2 | 1/2005 | Uzoh et al. | |
| 7,135,103 B2 | 11/2006 | Osaka et al. | |
| 7,192,662 B2 | 3/2007 | Chen et al. | |
| 7,569,131 B2 | 8/2009 | Hixon-Goldsmith et al. | |
| 7,595,959 B2 | 9/2009 | Covington et al. | |
| 8,000,063 B2 | 8/2011 | Yamaguchi et al. | |
| 8,118,990 B2 | 2/2012 | Liu et al. | |

(Continued)

FOREIGN PATENT DOCUMENTS

| | | | |
|---|---|---|---|
| CN | 110331372 A | 10/2019 | |
| EP | 0742549 A2 * | 11/1996 | ............... G11B 5/40 |

(Continued)

OTHER PUBLICATIONS

Jankowski et al. ("The thermal stability of nanocrystalline Au-Cu alloys," ScienceDirect, Thin Solid Films 515, pp. 1152-1156; Sep. 7, 2006.) (Year: 2006).*

(Continued)

*Primary Examiner* — William J Klimowicz
(74) *Attorney, Agent, or Firm* — Westman, Champlin & Koehler, P.A.

(57) ABSTRACT

A method includes immersing a wafer in an electrolyte including a plurality of compounds having elements of a thermally stable soft magnetic material. The method also includes applying a combined stepped and pulsed current to the wafer when the wafer is immersed in an electrolyte. The wafer is removed from the electrolyte when a layer of the thermally stable soft magnetic material is formed on the wafer.

7 Claims, 11 Drawing Sheets

(56) References Cited

U.S. PATENT DOCUMENTS

| | | | |
|---|---|---|---|
| 8,917,484 B2 | 12/2014 | Gong et al. | |
| 9,005,420 B2 | 4/2015 | Tomantschger et al. | |
| 9,359,683 B2 | 6/2016 | Kim et al. | |
| 9,466,319 B1 | 10/2016 | Tang et al. | |
| 9,598,785 B2 | 3/2017 | Patolsky et al. | |
| 9,601,484 B2 | 3/2017 | Herget et al. | |
| 9,626,990 B2 | 4/2017 | Tang et al. | |
| 2002/0154443 A1 | 10/2002 | Kawasaki et al. | |
| 2003/0044303 A1 | 3/2003 | Chen et al. | |
| 2003/0048582 A1 | 3/2003 | Kanada et al. | |
| 2003/0234181 A1* | 12/2003 | Palumbo | C25D 5/617 205/76 |
| 2004/0078970 A1 | 4/2004 | Naitoh et al. | |
| 2005/0121317 A1 | 6/2005 | Klocke et al. | |
| 2007/0058294 A1* | 3/2007 | Gotoh | G11B 5/3116 |
| 2007/0097547 A1 | 5/2007 | Yazawa et al. | |
| 2007/0242391 A1* | 10/2007 | Yamaguchi | G11B 5/11 |
| 2008/0088983 A1 | 4/2008 | Meyer et al. | |
| 2008/0166584 A1 | 7/2008 | Deligianni et al. | |
| 2010/0079895 A1* | 4/2010 | Takayama | G11B 5/3116 250/493.1 |
| 2012/0280773 A1* | 11/2012 | Singleton | G11B 5/3932 335/301 |
| 2013/0022840 A1 | 1/2013 | Hsiao et al. | |
| 2013/0027809 A1 | 1/2013 | Min et al. | |
| 2013/0334051 A1 | 12/2013 | Chen et al. | |
| 2014/0120374 A1* | 5/2014 | Zhu | G11B 5/3912 427/383.1 |
| 2014/0209476 A1 | 7/2014 | Zhou et al. | |
| 2019/0112722 A1* | 4/2019 | Gong | C25D 7/001 |

FOREIGN PATENT DOCUMENTS

| | | | | |
|---|---|---|---|---|
| EP | 2680264 A1 * | 1/2014 | | G11B 5/1278 |
| GB | 1 569 250 A | 6/1980 | | |
| GB | 2392922 A * | 3/2004 | | B82Y 10/00 |
| JP | H05-345997 A | 12/1993 | | |
| JP | H0923031 A * | 1/1997 | | H01F 41/302 |
| JP | H09-63016 A | 3/1997 | | |
| JP | H11154609 A * | 6/1999 | | B82Y 25/00 |
| JP | 2002056507 A * | 2/2002 | | G11B 5/1278 |

OTHER PUBLICATIONS

Additional U.S. Patent Office issued prosecution for U.S. Appl. No. 16/705,991, filed on Dec. 6, 2019, including: Notice of Allowance dated Feb. 14, 2022, 7 pages.; Applicant Initiated Interview Summary dated Dec. 14, 2021, 2 pages; Non-Final Rejection dated Oct. 7, 2021, 15 pages; 24 pages total.

Vossen, John L et al., "Thin Film Processes", Scientific Library, Dec. 10, 1979, Pat. & T.M. Office, Academic Press (AP), New York, San Francisco, London, 1978, A Subsidiary of Harcourt Brace Jovanovich, Publishers, 5 pages.

U.S. Patent Office issued prosecution for U.S. Appl. No. 15/785,698, filed Oct. 17, 2017, including: Final Office Action dated Aug. 8, 2019, 15 pages; Applicant Initiated Interview Summary dated May 30, 2019, 3 pages; Non-Final Rejection dated Feb. 26, 2019, 14 pages; Applicant Initiated Interview Summary dated Dec. 13, 2018, 3 pages; Requirement for Restriction-Election dated Oct. 25, 2018, 6 pages; 41 pages total.

U.S. Patent Office issued prosecution for U.S. Appl. No. 16/411,629, filed May 14, 2019, including: Notice of Allowance and Fees Due (PTOL-85) and Examiner Initiated Interview Summary dated Jul. 30, 2021, 10 pages; Applicant Initiated Interview Summary dated May 26, 2021, 2 pages; Non-Final Rejection dated Mar. 16, 2021, 9 pages; Requirement for Restriction-Election dated Nov. 10, 2020, 6 pages; 27 pages total.

U.S. Patent Office issued prosecution for U.S. Appl. No. 16/705,991, filed Dec. 6, 2019, including: Advisory Action dated Jul. 29, 2021, 2 pages; Applicant Initiated Interview Summary dated Jun. 30, 2021, 2 pages; Final Rejection issued May 28, 2021, 14 pages; Applicant Initiated Interview Summary issued Apr. 14, 2021, 2 pages; Non-Final Rejection dated Feb. 12, 2021, 14 pages; Requirement for Restriction-Election dated Dec. 31, 2020, 5 pages; 39 pages total.

Lou, Helen H et al., "Electroplating", Encyclopedia of Chemical Processing, DOI: 10.1081/E-ECHP-120007747, Copyright @ 2006 by Taylor & Francis, All Rights Reserved, 10 pages.

Final Office Action for U.S. Appl. No. 17/830,695, dated Aug. 24, 2023, 15 pages.

* cited by examiner

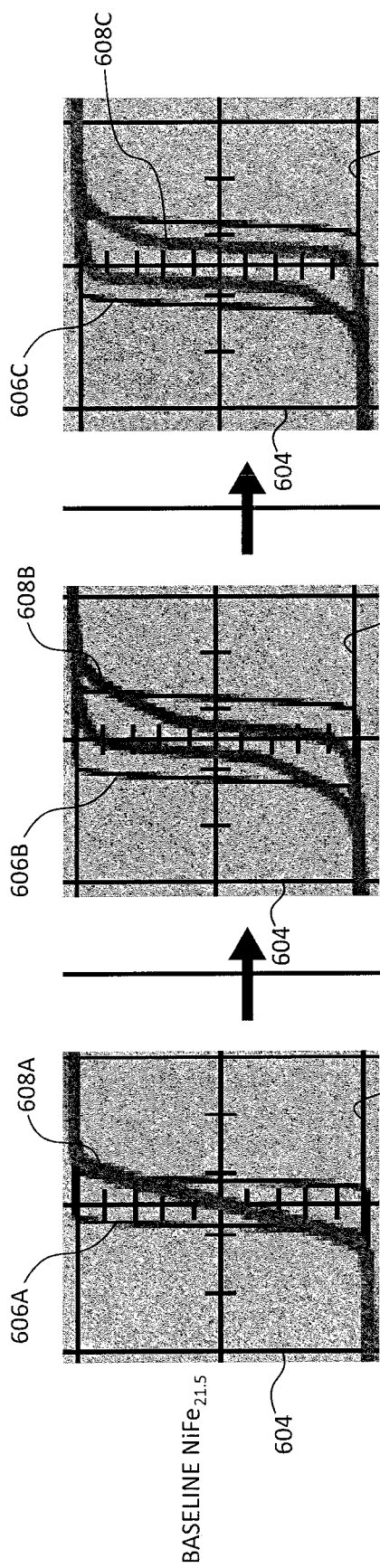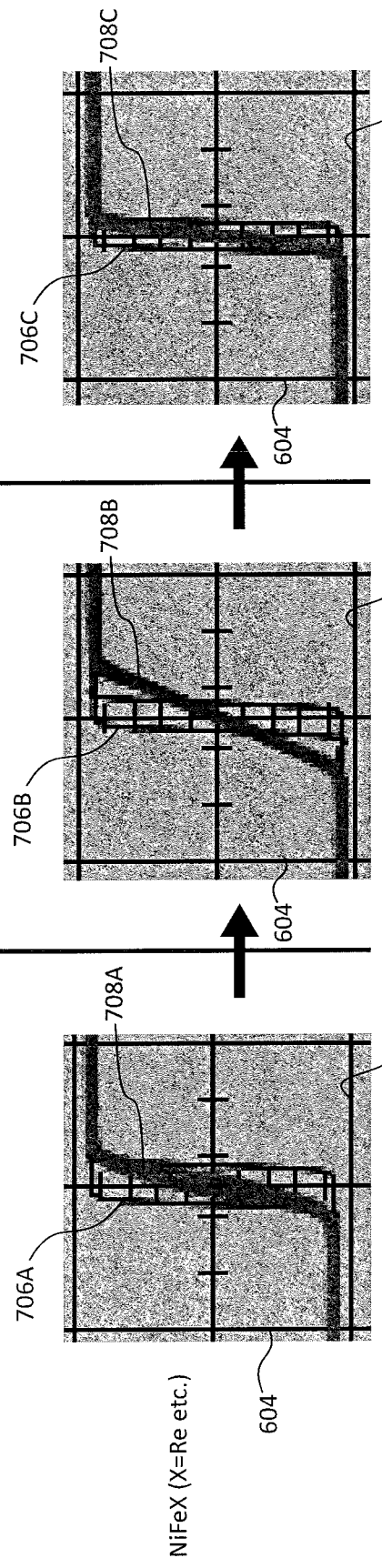

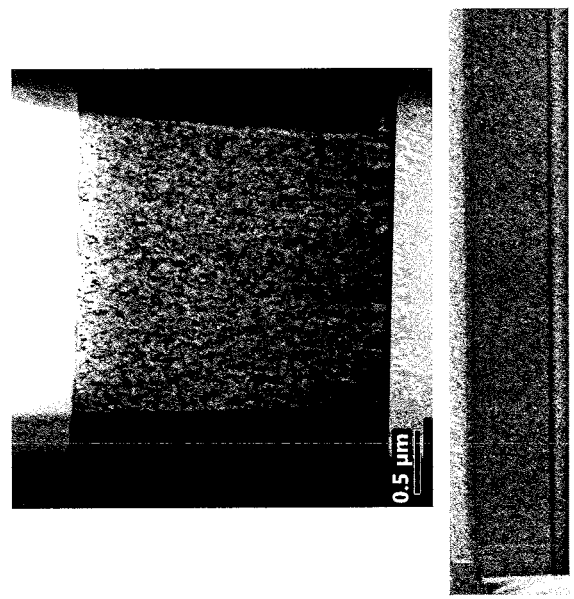
FIG. 13A
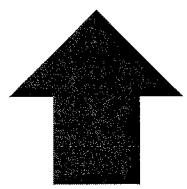
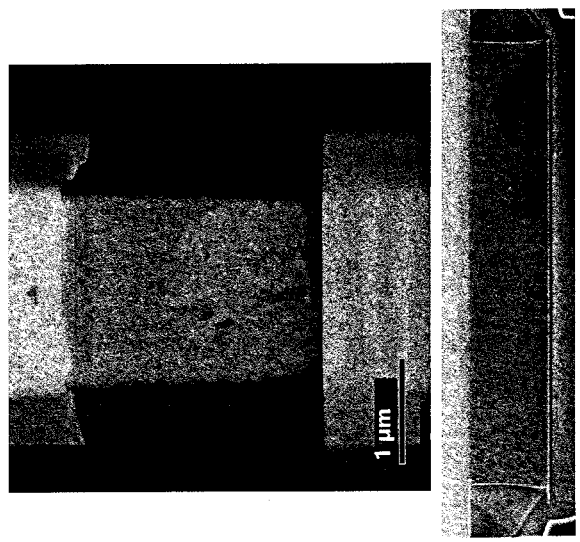
FIG. 12

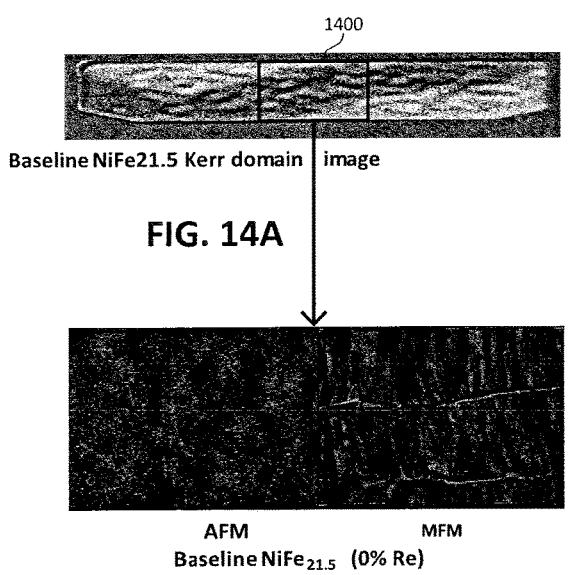
FIG. 14A
Baseline NiFe21.5 Kerr domain image
FIG. 14B
AFM　　　　　MFM
Baseline NiFe$_{21.5}$ (0% Re)
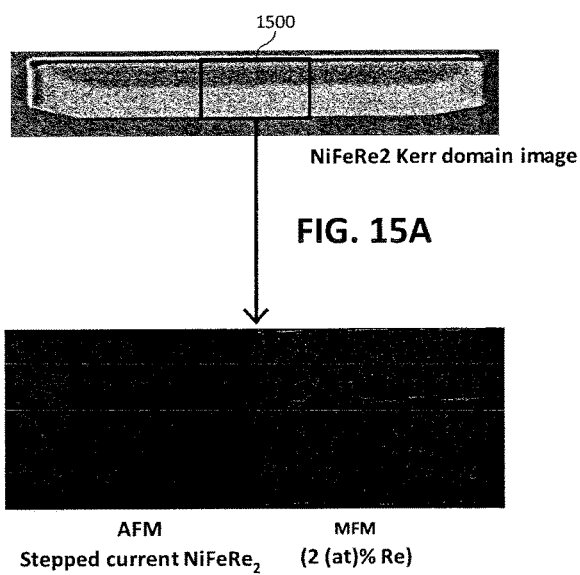
FIG. 15A
NiFeRe2 Kerr domain image
FIG. 15B
AFM　　　　　MFM
Stepped current NiFeRe$_2$ (2 (at)% Re)

ELECTRODEPOSITION OF THERMALLY STABLE ALLOYS

CROSS-REFERENCE TO RELATED APPLICATIONS

This application is a divisional of U.S. application Ser. No. 16/411,629, filed on May 14, 2019, now U.S. Pat. No. 11,152,020, which claims priority to U.S. provisional application number 62/671,125, filed on May 14, 2018, the contents of which are hereby incorporated by reference in their entireties.

SUMMARY

Various embodiments of the disclosure generally relate to forming thermally stable elements (e.g., thermally stable reader shields in recording heads or read heads). In different embodiments, electrodeposition or electroplating may be used to form the thermally stable elements with the high damping materials.

In one embodiment, a method is provided. The method includes immersing a wafer in an electrolyte including a plurality of compounds having elements of a thermally stable soft magnetic material. The method also includes applying a combined stepped and pulsed current to the wafer when the wafer is immersed in the electrolyte. The wafer is removed from the electrolyte when a layer of the thermally stable soft magnetic material is formed on the wafer.

In another embodiment, an electrolyte is provided. The electrolyte includes $H_3BO_3$ having a concentration in a range of between about 0.15 to about 0.6 moles/liter, $Ni^{2+}$ having a concentration in a range of between about 0.36 to about 0.78 moles/liter, and $Fe^{2+}$ having a concentration in a range of between about 5 to about 20 millimolar. The electrolyte further includes a 4 d or 5 d transition element having a concentration in a range of between about 0.1 to about 0.2 millimolar.

In yet another embodiment, a recording head is provided. The recording head includes at least one of a read head or a write head. The recording head also includes at least one thermally stable feature formed of a material having grains that include at least one element and a dopant. Each of the grains of the material has a size between about 6 nanometers and about 12 nanometers.

Other features and benefits that characterize embodiments of the disclosure will be apparent upon reading the following detailed description and review of the associated drawings.

BRIEF DESCRIPTION OF THE DRAWINGS

FIGS. 6A, 6B and 6C show magnetic hysteresis loops obtained for $Ni_{78.5}Fe_{21.5}$.

FIGS. 7A, 7B and 7C show magnetic hysteresis loops obtained for NiFeX.

FIG. 12 is an image of a NiFeX layer formed using galvanostatic plating and subjected to high temperature annealing.

FIG. 13A is an image of a NiFeX layer formed using stepped current plating and subjected to high temperature annealing.

FIG. 14A shows a Magneto optical Kerr domain image of an $Ni_{78.5}Fe_{21.5}$ layer after carrying out an annealing operation on the $Ni_{78.5}Fe_{21.5}$ layer.

FIG. 14B shows atomic force microscope (AFM) and MFM images of a portion of the $Ni_{78.5}Fe_{21.5}$ layer shown in FIG. 14A.

FIG. 15A shows a Magneto Optical Kerr domain image of a $NiFeX_2$ layer after carrying out an annealing operation on the $NiFeX_2$ layer.

FIG. 15B shows AFM and MFM images of a portion of the $NiFeX_2$ layer shown in FIG. 15A.

DETAILED DESCRIPTION OF ILLUSTRATIVE EMBODIMENTS

Embodiments of the disclosure generally relate to forming thermally stable elements (e.g., thermally stable reader shields in recording heads or read heads). The formation of the thermally stable read shields, for example, enables annealing operations on the read heads to be carried out at high temperatures (e.g., temperatures greater than or equal to 350 degrees Celsius (° C.)), which leads to improved performance of the read heads. In different embodiments, electrodeposition or electroplating may be used to form the elements. However, prior to providing additional details regarding the different embodiments, a description of an illustrative operating environment is provided below.

Figure 1:
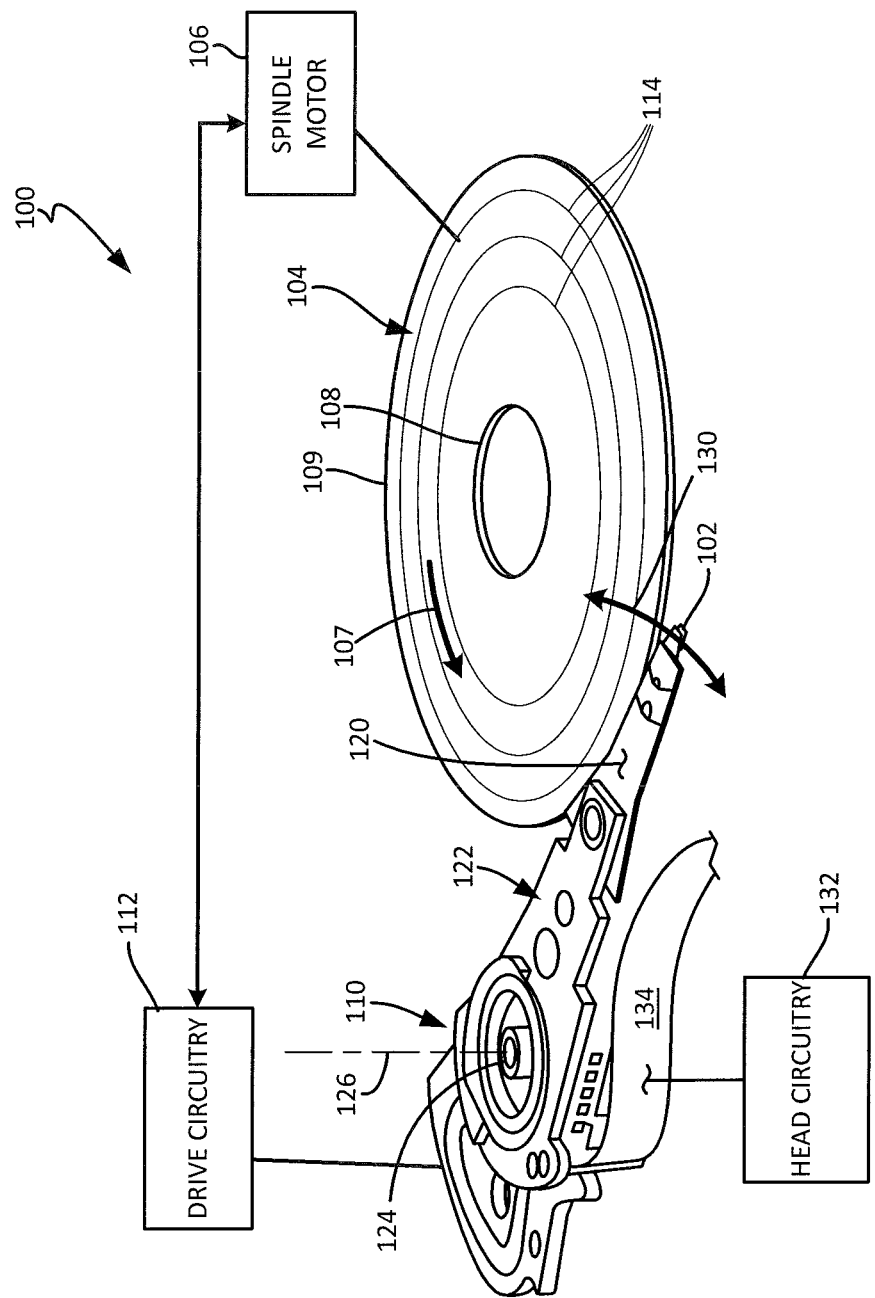
FIG. 1 illustrates an embodiment of a data storage device in which embodiments of the present application can be used.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1.

Embodiments of the present disclosure are illustratively practiced within any number of different types of operating environments.

It should be noted that the same reference numerals are used in different figures for same or similar elements. It should be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other storage medium that includes a storage layer (e.g., a magnetic storage layer) or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
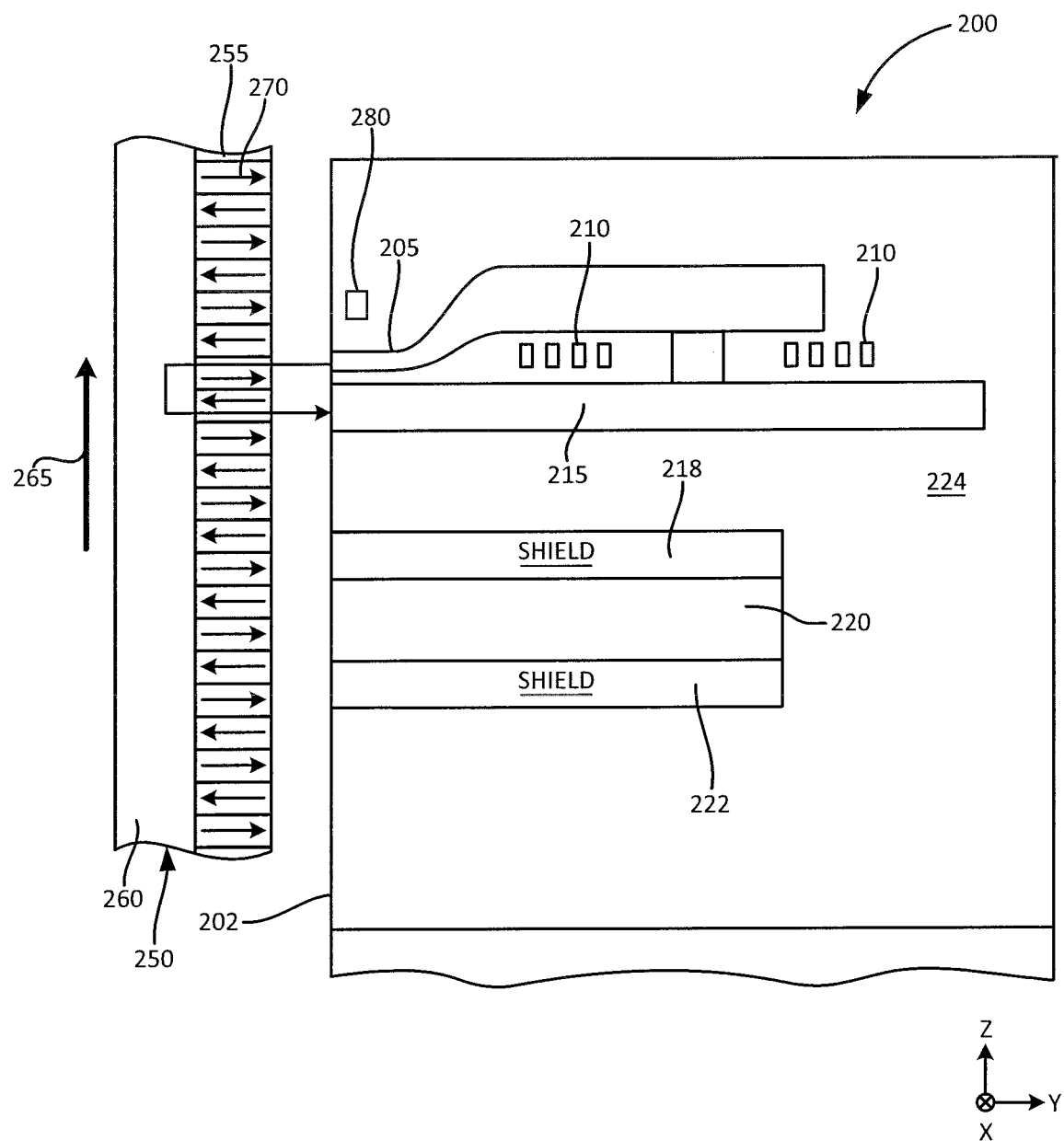
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield or leading shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

In embodiments of the disclosure, bottom shield or trailing shield 222 is formed of a thermally stable material, which allows for the use of high temperatures (>=350° C.) for annealing operations during formation of read transducer 220. Different layers of an embodiment of a read transducer or read sensor that employs a bottom shield or trailing shield 222 is shown in FIG. 3 and described below.

Figure 3:
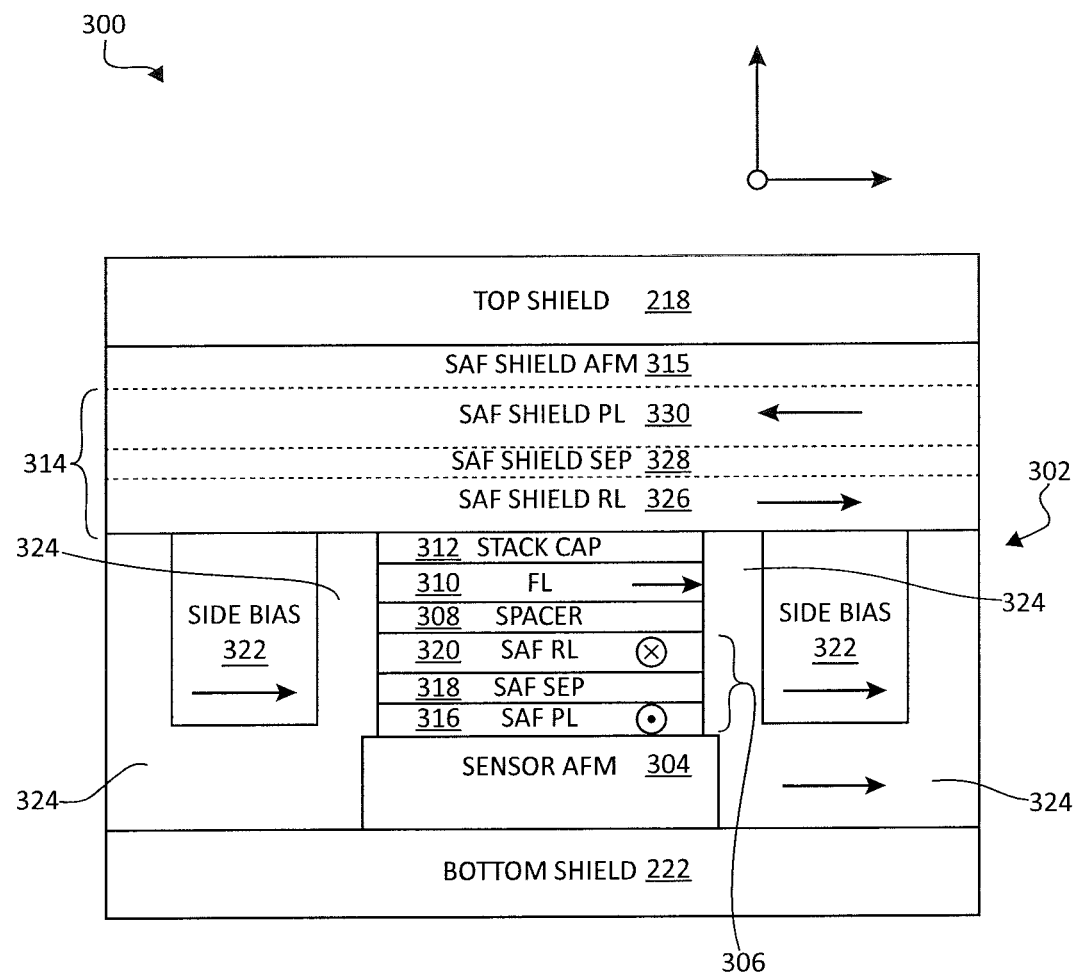
FIG. 3 is a bearing surface view of a magnetic reproducing device having a read sensor.

FIG. 3 is a schematic block diagram illustrating an example read head 300 including a magnetoresistive sensor 302. The magnetoresistive sensor 302 is positioned between top shield 218 and bottom shield 222. Top and bottom shields 218 and 222 reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 may include a plurality of layers including a sensor antiferromagnetic (AFM) layer 304, a sensor stack synthetic antiferromagnetic (SAF) structure 306, a spacer layer 308, a free layer or sensing layer 310 and a stack cap 312. A SAF shielding structure 314 and an AFM layer 315 may optionally be included above the stack cap 312. Dashed lines are used to represent elements of SAF structure 314 and AFM layer 315 to indicate that these structures are optional.

In the embodiment shown in FIG. 3, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (e.g., the y direction) of FIG. 3 and anti-parallel to each other.

The magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 332 are formed of soft magnetic material (e.g., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3.

In the embodiment shown in FIG. 3, optional SAF shielding structure 314 includes a SAF shield reference layer 326, a thin SAF shield separation layer 328, which may comprise a metal such as Ru in some embodiments, and a SAF shield pinned layer 330. Because, in some embodiments, sensor 300 utilizes soft side shields 322, SAF shield reference layer 326 has a relatively fixed magnetization to assist in stabilizing the magnetizations of side shields 322. Thus, in such embodiments, an AFM layer 315 pins the magnetization of SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 314 and AFM layer 315, side shields 322 may be stabilized by shape anisotropy, by employing hard magnetic layers adjacent to the soft magnetic layers within side shield 322, or by any other suitable technique.

In some embodiments, sensor 302 may utilize tunnel magnetoresistance (TMR) or giant magnetoresistance (GMR) effects. In embodiments that utilize TMR effects, spacer layer 308 is a tunneling barrier layer (e.g., a MgO barrier layer) that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3, either into the plane of the figure, or out of the plane of the figure. Thus, when the magnetoresistive sensor 302 passes over a data bit, the magnetic moment of the free layer 310 is rotated either into the plane of FIG. 3 or out of the plane of FIG. 3, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

Formation of read head 300 involves performing one or more annealing operations on layers of the read head 300. Advanced reader technology may employ a high reader annealing temperature (e.g., >=350° C., compared to annealing temperatures of 300° C. or less employed for current readers or baseline readers) to achieve a good TMR ratio (e.g., about 15% TMR gain), to realize high density and low noise reader performance. A reader bottom shield such as 222 with good thermal stability in grain structure, magnetics and domain behavior helps improve reader performance. Some current readers employ electrodeposited $Ni_{78.5}Fe_{21.5}$ as a bottom shield 222 material, which may not sustain annealing temperatures >300° C. For example, annealing temperatures >300° C. applied to readers having the currently-employed bottom shield material may result in the bottom shield 222 losing anisotropy and having a poor post-annealing domain structure. Further, a grain size increase from about 20 nanometers (nm) before annealing to about 350 nm after annealing may take place. Such post annealing changes may cause a relatively large increase in reader noise.

Embodiments of the disclosure provide a thermally stable soft magnetic material that is capable of withstanding annealing temperatures >350° C., and may therefore be utilized as a shield material (e.g., as a material that forms bottom shield 222) for advanced reader applications, for perpendicular magnetic recording (PMR) heads, heat assisted magnetic recording (HAMR) heads, etc. Embodiments of the disclosure may also be utilized to provide thermally stable soft magnetic or nonmagnetic materials for micro-electro-mechanical systems (MEMS), micro-actuators, magnetoresistive random access memory (MRAM) and inductor applications.

Figure 4A:
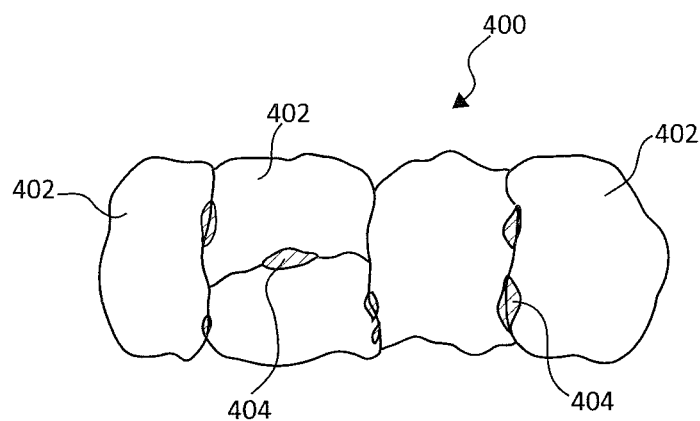
FIGS. 4A, 4B and 4C are simplified diagrams that illustrate a comparison between a structure of a soft magnetic material formed by a current electrodeposition technique and structures of soft magnetic materials formed in accordance with embodiments of the disclosure.
Figure 4B:
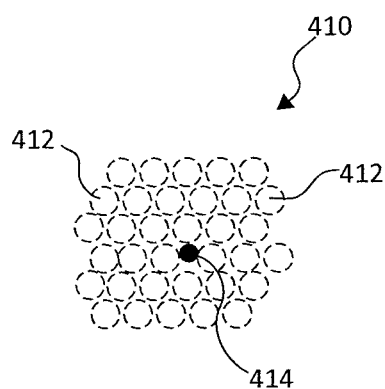
Figure 4C:
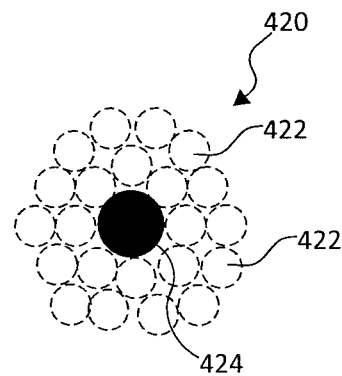

FIGS. 4A, 4B and 4C are simplified diagrams that illustrate a comparison between a structure of a soft magnetic material 400 formed by a current electrodeposition technique and structures of soft magnetic materials 410 and 420 formed in accordance with embodiments of the disclosure, which are described in detail further below. In FIG. 4A, the soft magnetic material 400 includes soft magnetic alloy (e.g., NiFe) grains 402 and an additive or dopant 404 that reacts with, or resides at, boundaries of grains 402. In contrast, in embodiments of the disclosure shown in FIGS. 4B and 4C, soft magnetic materials 410 and 420 include solute atoms (e.g., dopant atoms) 414 and 424, respectively, that distort lattices to deflect or trap vacancies in the lattices within a grain, and thereby do not reside at grain boundaries. As can be seen in FIGS. 4B and 4C, there may be a substantial size mismatch between the solute atom 414, 424 and a Ni/Fe atom 412, 422. In the structure 410 of FIG. 4B, solute atom 414 is substantially smaller than the Ni/Fe atom 412. In the structure of FIG. 4C, the solute atom 424 is substantially larger than the Ni/Fe atom 422. The high atomic size mismatch (between 412 and 414 in FIG. 4B, and between 422 and 424 in FIG. 4C) is beneficial for melting points. An electrodeposition method for forming, for example, an X doped NiFe film (where X may be Re or another 4d/5d hexagonal close-packed (hcp)/face centered cubic (fcc) transition metal such as Os, Ir, Pt, Rh, Pd, Ag, etc.) having a structure of the type shown in FIG. 4B or FIG. 4C in accordance with one embodiment is described below in connection FIG. 5. Doping concentrations and other details are provided further below in the description of FIG. 5.

Figure 5:
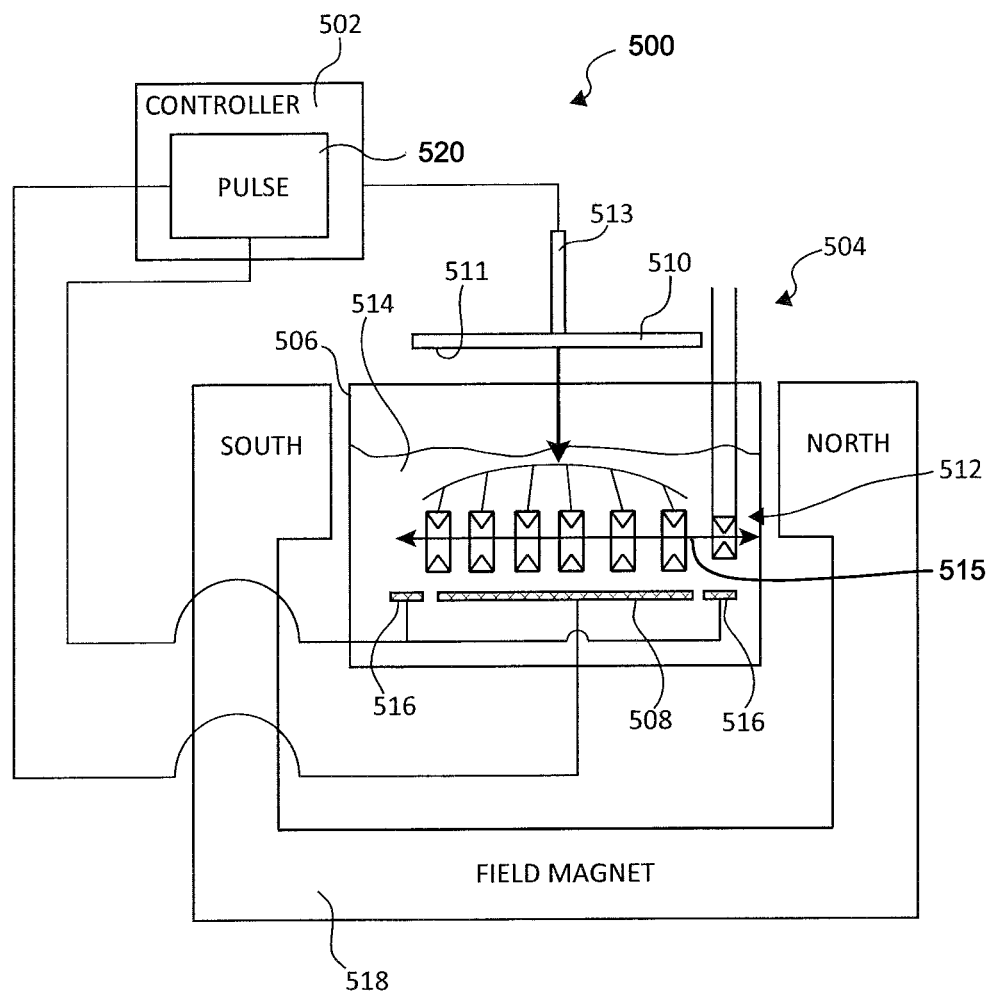
FIG. 5 is a diagrammatic illustration of an electroplating system in accordance with one embodiment.

FIG. 5 is a diagrammatic illustration of an electrodeposition/electroplating system 500 in accordance with one embodiment. Electroplating system 500 includes control circuitry 502 and a plating tank 504. Plating tank 504 includes a container 506, an anode 508, a cathode 510, a paddle assembly 512, a solution or electrolyte 514, cathodic thief elements 516 and a magnet 518.

Container 506 may be made of any suitable material, which may not be electrically conductive (e.g., glass or plastic). Anode 508 is positioned within the container 506 and may be located relatively close to a bottom of the container 506 as shown in FIG. 5. Anode 508 may be formed of a wire mesh or a combination of a plate and a wire mesh. The plate and/or wire mesh may be formed of platinum (Pt) and/or Nickel (Ni).

Cathode 510 includes an electrically conductive wafer on which a thermally stable soft magnetic material is to be deposited. As can be seen in FIG. 5, the wafer 510 has an exposed surface 511 on which the thermally stable soft magnetic material is to be deposited. Surface 511 may include a photoresist pattern if only portions of surface 511 are to be deposited with the thermally stable soft magnetic material. If no photoresist pattern is included on surface 511, the thermally stable soft magnetic material will be deposited on the entire exposed surface 511. In some embodiments, the wafer may include an electrically conductive substrate and an electrically conductive seed layer (e.g., a NiFe seed layer) with surface 511 being an exposed surface of the electrically conductive seed layer. The cathode 510 may be releasably coupled to, and supported by, an arm 513 which, with the help of control circuitry 502, immerses the cathode 510 into the container 506 for deposition of the thermally stable soft magnetic material. In some embodiments, manual adjustments to a position of the arm 513 may be carried out in order to immerse the cathode 510 into the solution 514. Once the deposition process is complete, the wafer 510 with the thermally stable soft magnetic material layer deposited thereon may be removed from the solution 514 by the arm 513 under the control of control circuit 502 and/or by manual adjustments of the position of the arm 513. The removed wafer 510 may then be detached from the arm 513. In should be noted that positioning the cathode 510 above the anode 508 within container 506 provides certain advantages. For example, if a thermally stable soft magnetic material layer is to be deposited on a number of wafers, positioning the cathode 510 in a manner shown in FIG. 5 allows for relatively rapidly attaching a first wafer to the arm 513, immersing the first wafer into the electrolyte substantially immediately after its attachment to the arm 513, carrying out the deposition of the thermally stable soft magnetic material layer, removing and detaching the first wafer, and then processing the next wafer in a similar manner. Further, bubbles that may be formed on the cathode 510 during electrodeposition move in an upward direction and may escape from the electrolyte 514 instead of attaching to the cathode. In spite of different advantages with the cathode 510 positioned above the anode 508, in certain embodiments, the positions of the cathode 510 and the anode 508 may be reversed.

In general, solution/bath/electrolyte 514 within container 506 may include several compounds that are suitable for deposition of the thermally stable soft magnetic material layer. Examples of compounds that may be used to deposit a NiFeX thermally stable soft magnetic material on the wafer 510 are included in Table 1 below.

TABLE 1

| COMPOUND | RANGE/VALUE |
| --- | --- |
| $H_3BO_3$ | about 0.15 to about 0.6 moles/liter |
| $Ni^{2+}$ | about 0.36 to about 0.78 moles/liter |
| Organic additives | <1 gram/liter |
| sodium lauryl sulfate or sodium dodecyl sulfate | about 0.1 grams/liter |
| $Fe^{2+}$ | about 5 to about 20 millimolar |
| X elements (e.g., Re, Ir, Os, etc.) | about 0.1 to about 0.2 millimolar |
| $Fe^{3+}$ | less than about 0.01 moles/liter |
| pH | about 2 to about 3 |

Sources of $Ni^{2+}$ and $Fe^{2+}$ may include chlorides, sulfates and perchlorates, and X elements may be any salt including that element and that is dissolvable in an aqueous solution. Solution or bath 514 may substantially constantly be stirred by reciprocating mixing element or paddle 512, which travels back and forth (as shown by bidirectional arrow 515) below surface 511 of the wafer 510. Paddle 512 is typically in close proximity with surface 511 and provides the agitation of the bath 514 with minimum turbulence. It should be noted that, instead of a single mixing element or paddle 512, multiple paddles may be employed, with each of the multiple paddles having a stroke that is a fraction of the stroke of the single paddles.

In the embodiment if FIG. 5, controller 502 includes pulse current supply circuitry 520, which is electrically coupled to anode 508, to cathode/wafer 510 and to cathodic thief element elements 516. Cathodic thief elements 516 may be in a substantially same plane as the anode 508 and are included to steal current away from edges of the wafer 510, and thereby help ensure that the deposition on the wafer 510 is uniform. It should be noted that, in some embodiments, pulse current supply circuitry 520 may be separate from controller 502. During operation, to supply a pulse current, circuitry 520 may toggle the current between high and low values (e.g., circuitry 520 may be turned on and off for predetermined intervals of time) to provide suitable deposition conditions. Table 2 below includes examples of deposition conditions.

TABLE 2

| CONDITION | RANGE/VALUE |
| --- | --- |
| time that current supply circuitry is on (t_on) | about 40 to about 400 milliseconds |
| time that current supply circuitry is off (t_off) | about 500 to about 1000 milliseconds |
| pulse peak current density (I) | about 35 milliamperes/square centimeter to about 100 milliamperes/square centimeter |
| rate of formation of the thermally stable soft magnetic material layer | about 40 nanometers/minute to about 400 nanometers/minute |

An electrolyte provided as show in Table 1 and the conditions shown in Table 2 may be used in the apparatus of FIG. 5 to form $(Ni_{70-85}Fe_{15-30})_{95-99}X_{1-5}$ with the following properties:

Stress between about 150 to about 250 mega pascals (MPa).

Saturation magnetization (Bs) between about 0.5 to about 1.5 Tesla.

Easy axis coercivity (Hce) between about 1 to about 4 Oersted.

Hard axis coercivity (Hch) between about 0 to about 0.4 Oersted.

Magnetic anisotropy field (Hk) between about 2 to about 7 Oersted

Magnetostriction about $2\text{-}3 \times 10^{-6}$.

A reader bottom shield such a 222 of FIG. 2 may be formed using the electrodeposition technique described above in connection with FIG. 5 with the compounds and conditions shown in Table 1 and Table 2, respectively. As indicated earlier, embodiments of the disclosure may also be utilized to provide thermally stable soft magnetic or non-magnetic materials for MEMS, micro-actuators, MRAM and inductor applications. It should be noted that compounds in Table 1 may be different for different embodiments. One example in which thermally stable nonmagnetic materials are useful is HAMR.

Referring back to FIG. 2, in some embodiments, recording head 200 may be a HAMR head that includes elements 280 for heating magnetic storage medium 250 proximate to where write pole 205 applies the magnetic write field to the storage medium 250. Elements 280 are shown as a single box in FIG. 2 in the interest of simplification. At least one of elements 280 (e.g., a non-magnetic element including Au and Cu) may be formed by an electrodeposition technique of the type described above in connection with FIG. 5. Experimental results from magnetic layer embodiments are described below.

FIGS. 6A, 6B and 6C show magnetic hysteresis loops obtained for $Ni_{78.5}Fe_{21.5}$. In FIGS. 6A, 6B and 6C, horizontal axis 602 represents an applied magnetic field (H) in Oersted (Oe) and a vertical axis 604 represents normalized flux. Further, in FIGS. 6A, 6B and 6C, loops 606A, 606B and 606C, respectively, are easy axis magnetic loops and loops 608A, 608B and 608C are respective hard axis loops. Loops 606A and 608A are easy axis and hard axis loops, respectively, for an as-deposited layer of $Ni_{78.5}Fe_{21.5}$ (e.g., a $Ni_{78.5}Fe_{21.5}$ layer that has not undergone annealing after deposition). Loops 606B and 608B are easy axis and hard axis loops, respectively, for the $Ni_{78.5}Fe_{21.5}$ layer after it has undergone an easy axis anneal at about 350-400° C. for about 2 hours. Loops 606C and 608C are easy axis and hard axis loops, respectively, for the $Ni_{78.5}Fe21.5$ layer after it has further undergone a hard axis anneal at about 325-350° C. for about 2 hours.

FIGS. 7A, 7B and 7C show magnetic hysteresis loops obtained for NiFeX (where X=Re, Os, Ir, Pt, Rh, Pd, Ag, etc.). As in the case of FIGS. 6A, 6B and 6C, in FIGS. 7A, 7B and 7C, horizontal axis 602 represents an applied magnetic field (H) in Oersted (Oe) and a vertical axis 604 represents normalized flux. Further, in FIGS. 7A, 7B and 7C, loops 706A, 706B and 706C, respectively, are easy axis magnetic loops and loops 708A, 708B and 708C are respective hard axis loops. Loops 706A and 708A are easy axis and hard axis loops, respectively, for an as-deposited layer of NiFeX (e.g., a NiFeX layer that has not undergone annealing after deposition). Loops 706B and 708B are easy axis and hard axis loops, respectively, for the NiFeX layer after it has undergone an easy axis anneal at about 350-400° C. for about 2 hours. Loops 706C and 708C are easy axis and hard axis loops, respectively, for the NiFeX layer after it has further undergone a hard axis anneal at about 325-350° C. for about 2 hours.

From FIGS. 6B and 6C, it is seen that magnetic properties of $Ni_{78.5}Fe_{21.5}$ deteriorate after high temperature annealing operations. In contrast, from FIGS. 7B and 7C, it is seen that the magnetic properties of NiFeX remain excellent after the high temperature annealing operations, thereby showing that NiFeX is substantially more thermally stable than $Ni_{78.5}Fe_{21.5}$.

Figure 10A:
FIG. 10A is an image of a $NiFeX_2$ layer generated from TEM.
Figure 10B:
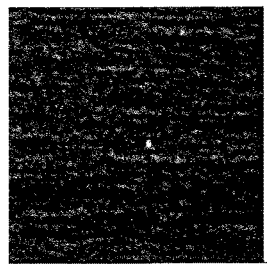
FIG. 10B is an image of a $NiFeX_2$ layer generated from a MFM.
Figure 10C:
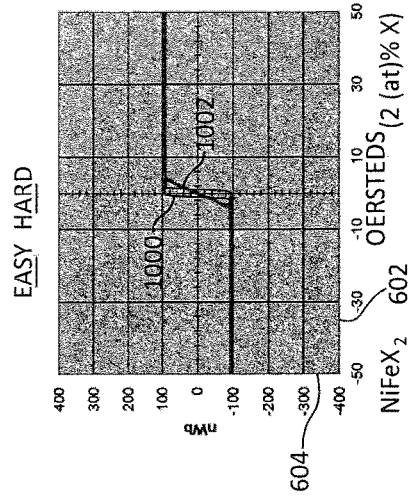
FIG. 10C shows a magnetic hysteresis loop obtained for $NiFeX_2$.
Figure 9A:
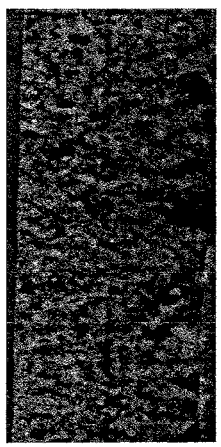
FIG. 9A is an image of a $NiFeX_1$ layer generated from TEM.
Figure 9B:
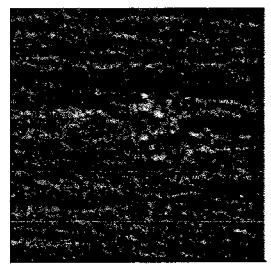
FIG. 9B is an image of a $NiFeX_1$ layer generated from a MFM.
Figure 9C:
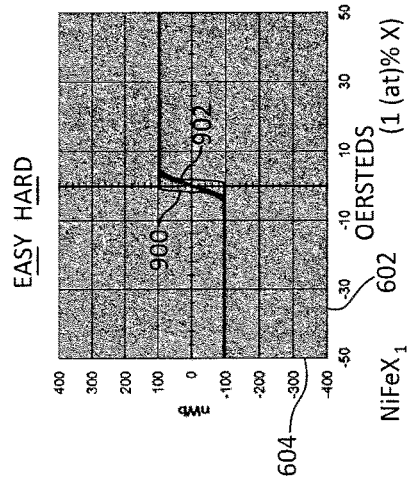
FIG. 9C shows a magnetic hysteresis loop obtained for $NiFeX_1$.
Figure 8A:
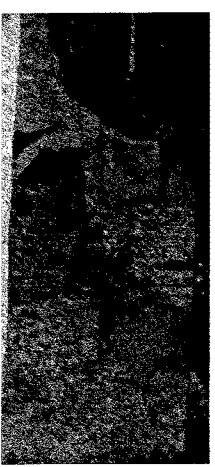
FIG. 8A is an image of a $Ni_{78.5}Fe_{21.5}$ layer generated from transmission electron microscopy (TEM).
Figure 8B:
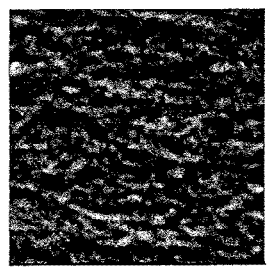
FIG. 8B is an image of a $Ni_{78.5}Fe_{21.5}$ layer generated from a magnetic force microscope (MFM).
Figure 8C:
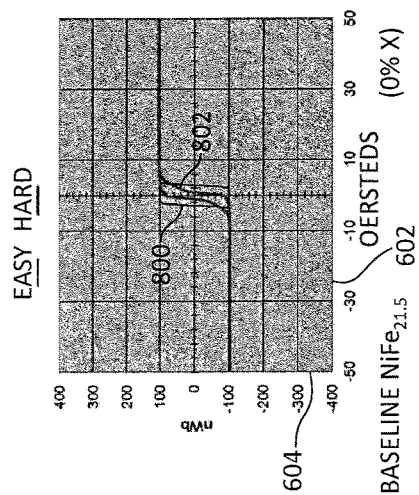
FIG. 8C shows a magnetic hysteresis loop obtained for $Ni_{78.5}Fe_{21.5}$.

FIGS. 8A, 8B and 8C relate to $Ni_{78.5}Fe_{21.5}$, FIGS. 9A, 9B and 9C relate to $NiFeX_1$ (1 atomic percent (at %) Re) and FIGS. 10A, 10B and 10C relate to $NiFeX_2$ (2 at % Re). FIGS. 8A, 9A and 10A are images, generated from transmission electron microscopy (TEM), of layers of $Ni_{78.5}Fe_{21.5}$, $NiFeX_1$, and $NiFeX_2$, respectively, which show an improvement in grain stabilization in $NiFeX_1$ over $Ni_{78.5}Fe_{21.5}$, and a further improvement in grain stabilization in $NiFeX_2$. FIGS. 8B, 9B and 10B are images, generated from a magnetic force microscope (MFM), of layers of $Ni_{78.5}Fe_{21.5}$, $NiFeX_1$, and $NiFeX_2$, respectively, which show a reduction in magnetic out of plane noise in $NiFeX_1$ over $Ni_{78.5}Fe_{21.5}$, and a further reduction in magnetic out of plane noise in $NiFeX_2$. Additionally, an improvement in magnetic softness is seen in $NiFeX_1$ over $Ni_{78.5}Fe_{21.5}$, and a further improvement in magnetic softness is seen in $NiFeX_2$.

FIGS. 8C, 9C and 10C show magnetic hysteresis loops obtained for $Ni_{78.5}Fe_{21.5}$, $NiFeX_1$, and $NiFeX_2$, respectively. In FIGS. 8C, 9C and 10C, horizontal axis 602 represents an applied magnetic field (H) in Oe and vertical axis 604 represents flux in nanowebers (nWb). Further, in FIGS. 8C, 9C and 10C, loops 800, 900 and 1000, respectively, are easy axis magnetic loops and loops 802, 902 and 1002 are respective hard axis loops. From FIGS. 8C, 9C and 10C, an improvement in magnetic softness is seen in $NiFeX_1$ over $Ni_{78.5}Fe_{21.5}$, and a further improvement in magnetic softness is seen in $NiFeX_2$. This demonstrates that doping NiFe with X (e.g., Re) has a positive influence on thermal stability, microstructure and magnetic properties.

Figure 11:
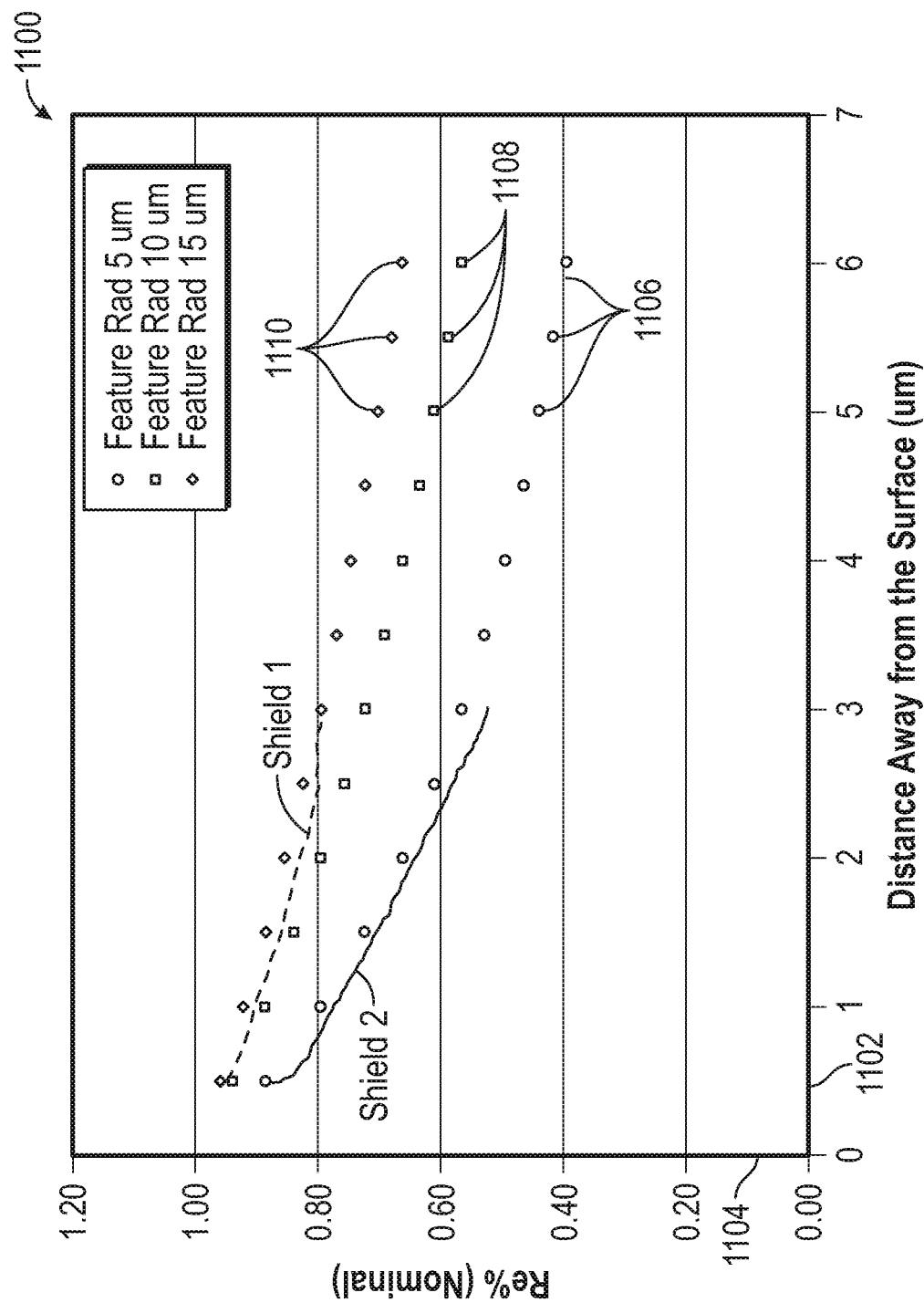
FIG. 11 is a graph that shows a presence of a composition gradient in a patterned wafer.

FIG. 11 is a graph 1100 that shows a presence of a composition gradient in a patterned wafer. In FIG. 11, horizontal axis 1102 represents a distance away from a surface of the patterned wafer in micrometers (um) and vertical axis 1104 represents nominal Re %. Points 1106 are for a feature having a radius of 5 um, points 1108 are for a feature having a radius of 10 um, and points 1110 are for a feature having a radius of 15 um. From FIG. 11, it is seen that a composition gradient exists in the patterned feature, and Re at % increases with film growth in the feature. It is further seen from FIG. 11 that the smaller the feature, the more significant the composition gradient.

FIG. 12 is an image of a NiFeX layer formed using galvanostatic plating (e.g., 100 mA/cm$^2$) and subjected to high temperature annealing. As can be seen in FIG. 12, there are substantially large grains at a bottom of the layer due to the composition gradient described above in connection with FIG. 11.

Figure 13B:
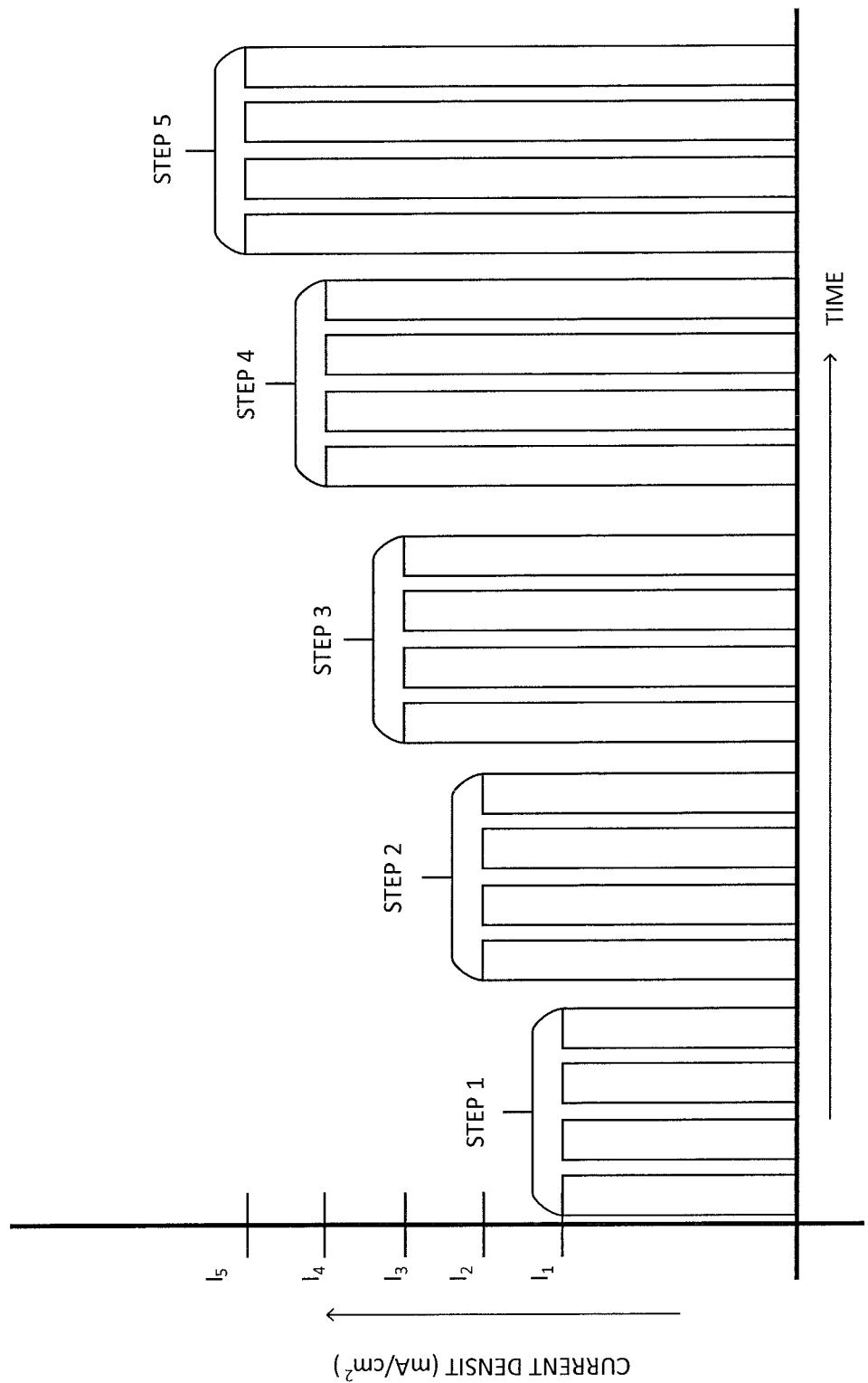
FIG. 13B is an example of a stepped current waveform that may be utilized to form the NiFeX layer shown in FIG. 13A.

FIG. 13A is an image of an NiFeX layer formed using stepped current plating (e.g., $I_1$-$I_2$-$I_3$-$I_4$-$I_5$ mA/cm$^2$) and subjected to high temperature annealing. The image of FIG. 13A shows a substantially uniform grain structure due to composition homogeneity. An example of a stepped current waveform utilized to form the NiFeX layer is shown in FIG. 13B. As can be seen in FIG. 13B, the waveform is a pulsed current with the t_on peak current changed (e.g., increased) in steps ($I_1$-$I_2$-$I_3$-$I_4$-$I_5$) after predetermined time intervals. Accordingly, the current applied during electrodeposition may be a combined stepped and pulsed current having a form shown in FIG. 13B. It should be noted that, in the interest of simplification, the peak current is shown as changing after 4 pulses. However, in different embodiment, the peak current may be changed after any suitable number of pulses. Also, different steps shown in FIG. 13B may have same or different numbers of pulses in different embodiments.

FIG. 14A shows a Kerr domain image of a $Ni_{78.5}Fe_{21.5}$ layer after carrying out an annealing operation on the $Ni_{78.5}Fe_{21.5}$ layer. FIG. 14B shows atomic force microscope (AFM) and MFM images of a portion 1400 of the $Ni_{78.5}Fe_{21.5}$ layer shown in FIG. 14A. FIG. 15A shows a Kerr domain image of a $NiFeX_2$ layer after carrying out an annealing operation on the $NiFeX_2$ layer. FIG. 15B shows AFM and MFM images of a portion 1500 of the $NiFeX_2$ layer shown in FIG. 15A. A comparison of FIG. 14B and 15B shows that, after a high temperature anneal is performed on $Ni_{78.5}Fe_{21.5}$ and $NiFeX_2$, domain stability of $NiFeX_2$ is greatly improved compared with $Ni_{78.5}Fe_{21.5}$. In general, after a high temperature anneal, domain stability of NiFeX is greatly improved compared with $Ni_{78.5}Fe_{21.5}$.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A recording head comprising:
   at least one of a read head or a write head; and
   at least one thermally stable feature formed of a material having grains that include at least one element and a first dopant:
     with each of the grains of the material having a size between about 6 nanometers and about 12 nanometers;
     wherein the at least one thermally stable feature comprises a first thermally stable feature that includes at least one read head shield;
     wherein the first dopant of the at least one read head shield comprises a 4 d or 5 d transition element comprising Re, Os, Ir, Pt, Rh, Pd or Ag; and
     wherein an atom of the first dopant is within the grain of the material.

2. The recording head of claim 1 and wherein the at least one element of the at least one read head shield comprises at least one magnetic element including a first magnetic alloy element and a second magnetic alloy element.

3. The recording head of claim 2 and wherein:
   the first magnetic alloy element comprises Ni; and
   the second magnetic alloy element comprises Fe.

4. The recording head of claim 2 and wherein the at least one thermally stable feature further comprises a second thermally stable feature that includes a heating assistance feature, and wherein the at least one element of the heating assistance feature comprises Au, and wherein a second dopant of the heating assistance feature comprises Cu.

5. The recording head of claim 1 and wherein the atom of the first dopant has a size that is substantially different from a size of an atom of the at least one element.

6. The recording head of claim 1 and wherein the atom of the first dopant is surrounded by a plurality of atoms of the at least one element within the grain.

7. The recording head of claim 1 and wherein the read head comprises a tunnel magnetoresistance head.

* * * * *